United States Patent [19]
Abe et al.

[11] Patent Number: 5,432,256
[45] Date of Patent: Jul. 11, 1995

[54] LIQUID CRYSTAL ALIGNING FILMS AND LIQUID CRYSTAL DISPLAY DEVICES

[75] Inventors: Yukino Abe, Ichihara; Minoru Nakayama, Minamata; Shizuo Murata, Ichihara, all of Japan

[73] Assignee: Chisso Corporation, Ohsaka, Japan

[21] Appl. No.: 71,989

[22] Filed: Jun. 7, 1993

[30] Foreign Application Priority Data

Jun. 8, 1992 [JP] Japan .................. 4-147434

[51] Int. Cl.$^6$ ............................ C08G 73/10
[52] U.S. Cl. .................... 528/353; 528/26; 528/28; 528/125; 528/128; 528/170; 528/172; 528/173; 528/174; 528/185; 528/188; 528/220; 528/229; 528/350; 428/1; 428/473.5; 359/75
[58] Field of Search ............. 528/353, 350, 170, 174, 528/172, 125, 128, 173, 26, 28, 220, 229, 188, 185; 428/1, 473.5; 359/75

[56] References Cited

U.S. PATENT DOCUMENTS

| | | | |
|---|---|---|---|
| 3,994,567 | 11/1976 | Matsuo et al. | 350/160 LC |
| 4,749,777 | 6/1988 | Kohtoh et al. | 528/353 |
| 4,864,008 | 9/1989 | Murata et al. | 528/125 |
| 5,053,544 | 10/1991 | Murata et al. | 564/430 |
| 5,084,557 | 1/1992 | Murata et al. | 428/1 |
| 5,135,678 | 8/1992 | Murata et al. | 528/353 |
| 5,149,771 | 9/1992 | Murata et al. | 528/353 |
| 5,276,132 | 1/1994 | Nishikawa et al. | 528/353 |
| 5,298,590 | 3/1994 | Isogai et al. | 528/353 |

FOREIGN PATENT DOCUMENTS

| | | |
|---|---|---|
| 0282254 | 9/1988 | European Pat. Off. |
| 0337355 | 10/1989 | European Pat. Off. |
| 0415447 | 3/1991 | European Pat. Off. |
| 2101760 | 1/1983 | United Kingdom |

Primary Examiner—Paul R. Michl
Assistant Examiner—P. Hampton-Hightower
Attorney, Agent, or Firm—Leydig, Voit & Mayer

[57] ABSTRACT

The present invention provides a liquid crystal aligning film having a reduced after image and a good liquid crystal aligning property caused by a rubbing treatment of a thin film consisting of organics, and its liquid crystal display device. Specifically, they are liquid crystal aligning films containing a polymer having the skeleton represented by the general formula (1):

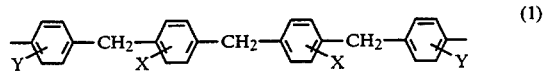

in its principal chain as a main component; a liquid crystal aligning film containing a polyimide having a structural unit represented by the general formula (2):

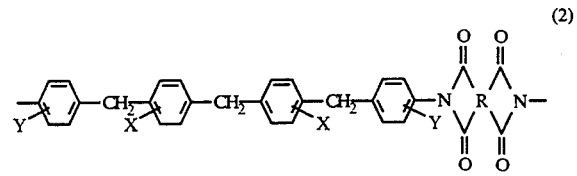

as the main component wherein X and Y each represent the same or atoms or groups including hydrogen atoms, an alkyl group having from 1 to 3 carbon atoms, a fluorine atom, a chlorine atom or a trifluoromethyl group, wherein their substituent positions may be at the ortho-position or the meta-position, and R shows a tetravalent aromatic or aliphatic group or a composite group having both tetravalent aromatic and aliphatic properties; and a liquid crystal display device prepared by using them.

7 Claims, 2 Drawing Sheets

LIQUID CRYSTAL ALIGNING FILMS AND LIQUID CRYSTAL DISPLAY DEVICES

BACKGROUND OF THE INVENTION

1. Field of the Invention

The present invention relates to a liquid crystal aligning film and a liquid crystal display device. More specifically, it relates to a liquid crystal aligning film having a polybenzylimide skeleton and to a liquid display device prepared by using this film.

2. Description of the Prior Art

A twisted nematic (which will hereinafter be abbreviated as TN) mode is one in which the aligned direction or a nematic liquid crystal provided between a pair of upper and lower electrode substrates has been twisted 90° on the surfaces of the substrates. It has been used extensively. There is another mode in which the aligned direction of a nematic liquid crystal is twisted from 180° to 300° and it is known as a super nematic mode (which will hereafter be abbreviated as STN). Furthermore, in recent years, in order to perform a matrix display or a color display by means of liquid crystals, many developments have been made regarding an active type twisted nematic mode using a majority of picture element electrodes and MIM (metal—insulating phase—metal) elements or TFT (field effect type thin film transistor) elements for their ON-OFF operation.

The common problem for all these modes are that when the same image is displayed for a long time and then a transfer to a new image is made, the previous image remains as an after image. In particular, the improvement in the after image is very important in order to obtain a high quality liquid crystal display device.

It is considered that the causes of the after image may be due to a potential difference, that is to say: since a DC component is added to a liquid crystal display device, electric double layers due to the impure ionic components contained in the liquid crystal are produced on the interfaces of the liquid crystal aligning film. The offsetting of electric charges is given between the upper and lower substrates and such a potential difference as to keep the condition stable is created. Since DC components cannot be removed, particularly from the TFT elements due to the characteristics of the elements, these problems of after image are easily highlighted more than those in TN and STN and look serious. Furthermore, a higher voltage holding ratio is required for preventing the flickering of the image in the TFT mode.

As for an aligning film used in such liquid crystal display devices, organic type films, such as polyimides and polyamides, are mainly used. For example, Japanese patent application laid-open No. Sho 51-65960 discloses a liquid crystal display device having a liquid crystal aligning film using a polyimide resin constituted of the repeated unit represented by:

There was, however, a problem in that an after image is easily caused in such a device using a polyimide aligning film obtained by using such a polyether compound.

SUMMARY OF THE INVENTION

It is, accordingly, a primary object of the present invention to solve the above problem of the prior art and to obtain a liquid crystal aligning film and a liquid crystal display device where a good liquid crystal alignment property can be obtained and an after image is reduced by the rubbing treatment of the thin film consisting of organics.

The present inventors have considered that the after image may be produced since the electric charges due to impurities as ions are offset on the surface of the aligning film, resulting in their stabilization, and have conducted research and development to eliminate the after image. As a result, the present inventors have found that the generation of an after image has a correlation with the superficial polarity of the aligning film.

Then, the present inventors developed an aligning film having the following structure so as to prevent the after image from occurring by lessening the superficial polarity of the polymer.

Specifically, the ratio of polar components was reduced by transforming a bond including a polar atom or groups as represented by —O— or —SO$_2$— contained in the polymer into a carbon bond, and by relatively reducing the ratio of imide groups by way of increasing the molecular weight of the amine.

Namely, a first invention of this application is a liquid crystal aligning film containing a polymer, as the main component, having in its principal chain a skeleton represented by the general formula (1):

wherein X and Y each represent the same or different atoms or groups including hydrogen atoms, an alkyl group having from 1 to 3 carbon atoms, a fluorine atom, a chlorine atom or a trifluoromethyl group, these substituent positions being at the ortho-position or the meta-position.

Then, a second invention of this application is a liquid crystal aligning film containing a polyimide, as the main component, having a structural unit represented by the general formula (2):

wherein X and Y each represent the same or different atoms or groups including hydrogen atoms, an alkyl group having from 1 to 3 carbon atoms, a fluorine atom, a chlorine atom or a trifluoromethyl group, their substituent positions being at the ortho-position or the meta-position, and R represents a tetravalent aromatic or aliphatic group or a composite group having both tetravalent aromatic and aliphatic properties.

A third invention of this application is a liquid crystal aligning film containing polyimide, as the main component, prepared by heating polyamic acid prepared by reacting, in a solvent, tetracarboxylic acid dianhydride represented by the general formula (3):

wherein R represents a tetravalent aromatic or aliphatic group, or a composite group having both tetravalent aromatic and aliphatic properties, with a diamino compound represented by the general formula (4):

wherein X and Y each represent the same or different atoms or groups including hydrogen atoms, an alkyl group having from 1 to 3 carbon atoms, a fluorine atom, a chlorine atom or trifluoromethyl group, their substituent positions being at the ortho-position or the meta-position.

Furthermore, a fourth invention of this application is a liquid crystal display device using the liquid crystal aligning film described above.

Some specific examples of diamine compounds used in the invention can be listed as follows:

1,1-bis[4-(4'-aminobenzyl)phenyl]methane;
1,1-bis[4-(4'-amino-3-methylbenzyl)phenyl]methane;
1,1-bis[4-(4'-amino-3-ethylbenzyl)phenyl]methane;
1,1-bis[4-(4'-amino-3-propylbenzyl)phenyl]methane;
1,1-bis[4-(4'-amino-3-fluorobenzyl)phenyl]methane;
1,1-bis[4-(4'-amino-3-chlorobenzyl)phenyl]methane;
1,1-bis[4-(4'-amino-3-trifluoromethylchlorobenzyl)phenyl]methane;
1,1-bis[4-(4'-aminobenzyl)-3-methylphenyl]methane;
1,1-bis[4-(4'-aminobenzyl)-3-ethylphenyl]methane;
1,1-bis[4-(4'-aminobenzyl)-3-propylphenyl]methane;
1,1-bis[4-(4'-aminobenzyl)-3-fluorophenyl]methane;
1,1-bis[4-(4'-aminobenzyl)-3-chlorophenyl]methane; and
1,1-bis[4-(4'-aminobenzyl)-3-trifluoromethylphenyl]methane.

As for tetracarboxylic acid dianhydride used in the invention, either of an aromatic type, an aliphatic type and a composite type having both aromatic and aliphatic properties, may be used. There are no restrictions, but specifically illustrated, there are listed as follows: pyromellitic acid dianhydride; biphenyltetracarboxylic acid dianhydride; benzophenonetetracarboxylic acid dianhydride; naphthalenetetracarboxylic acid dianhydride;
bis(dicarboxyphenyl)ether dianhydride;
bis(dicarboxyphenyl)sulfone dianhydride;
bis(dicarboxyphenyl)methane dianhydride;
cyclobutanetetracarboxylic acid dianhydride;
cyclopentanetetracarboxylic acid dianhydride;
cyclohexanetetracarboxylic acid dianhydride;
dicyclohexanetetracarboxylic acid dianhydride;
dicyclopentanetetracarboxylic acid dianhydride;
bis(dicarboxycyclohexyl)ether dianhydride;
bis(dicarboxycyclohexyl)sulfone dianhydride;
bis(dicarboxycyclohexyl)methane dianhydride;
5-(2,5-dioxotetrahydro-3-furanyl)-3-methyl-3-cyclohexene-1,2-dicarboxylic anhydride;
1,3,3a,4,5,9b-hexahydro-5-(tetrahydro-2,5-dioxo-3-furanyl)naphto[1, 2-c]furane-1,3-dione, etc.

In the liquid crystal aligning film of the invention, aminosilicone compounds or diaminosilicone compounds can be introduced so as to improve the adhesion to a substrate. As a specific example of a liquid crystal aligning film in which the above silicon compounds are introduced, there is provided a liquid crystal aligning film containing from 0.1 to 50 mol %, preferably from 0.1 to 20 mol %, of the total polyimide structure a unit represented by the formula (7):

in the film is replaced by a structural unit represented by the formula (5):

and/or the formula (6):

wherein, in the formulas (5) and (6), Z represents an alkylene or phenylene group having from 1 to 3 carbon atoms; $R^2$ represents an alkyl group having from 1 to six carbon atoms; R represents a tetravalent aromatic or aliphatic group of a composite group having both tetravalent aromatic and aliphatic properties; and m represents an integer from 0 to 4.

As for a specific example of introduced aminosilicone compounds, the following compounds can be listed. In the first place, as for an aminosilicone compound for producing a structural unit represented by the general formula (5), the following compounds can be listed:

-continued

H₂N—(CH₂)₃—Si(C₂H₅)(On-C₃H₇)₂

H₂N—(CH₂)₂—Si(OCH₃)₃

H₂N—(CH₂)₂—Si(OC₂H₅)₃

H₂N—(CH₂)₂—Si(CH₃)(OC₂H₅)₂

In the case of introducing these aminosilicone compounds into polybenzylimide type polymers, 50 mol % or less, preferably 20 mol % or less of diamino compounds represented by the general formula (4) can be replaced with aminosilicone compounds and used.

As for a diaminosilicone compound for producing a structural unit represented by the general formula (6), the following compounds can be listed.

-continued

In the formulas m represents an integer from 0 to 4. In the case of introducing these diaminosilicone compound into a polybenzylimide type polymer, 50 mol % or less, preferably 20 mol % or less, of a diamino compound represented by the above general formula (4) can be replaced with a diaminosilicone compound.

For mounting the liquid crystal aligning film of the invention on a substrate, since a polyimide compound is, in general, insoluble in solvents, a polyamic acid, which can be obtained from the condensation of a diamino compound and tetracarboxylic acid dianhydride as a precursor of this polyimide compound, is dissolved and coated on the substrate. For example, the polyamic acid is dissolved in a solvent, such as N-methyl-2-pyrolidone (NMP), dimethylacetamide (DHAc), dimethylformamide (DMF), dimethylsulfoxide (DHSO), butyl cellosolve or ethylcarbitol, to prepare a 0.1 to 30 wt. %, preferably 1 to 10 wt. % solution, which is coated on the substrate by brushing, immersing, rotational coating, spraying or print&rig to give a coated film. The coated film is then heat-treated at 50° to 150° C., preferably at 80° to 120° C., and subjected to a dehydrating ring formation reaction to give a liquid crystal aligning film consisting of a polybenzylimide type polymer film. When the adhesion of the polymer film to the substrate is not good, the surface of the substrate may be treated in advance with a silane coupling reagent, followed by forming a polymer film on it, thereby the above situation can be improved. Next, the coated surface is rubbed in a certain direction with a cloth to give a liquid crystal aligning film.

Normally, electrodes, for example, transparent electrodes such as ITO, are formed on this substrate. For preventing the alkali elution from the substrate, an undersheet film, such as an insulating film, polarized disk, or color filter, may be coated on the electrodes. Furthermore, an overcoat film, such as an insulating film, color filter film or light transmission preventing film, may be formed on the electrodes. The prior art liquid crystal display device constitution can be applied to these electrodes, undercoatings, overcoatings and the other components within a cell.

After preparing a cell using the above substrates and injecting liquid crystal between the substrates, the injection inlet is sealed. Otherwise, after liquid crystal is sprayed on the substrate, the substrate is overlapped on another and the resulting substrates may be sealed so as not to leak the liquid crystal. Normal nematic liquid crystals, dichroic liquid crystals and various other liquid crystals can be used as the liquid crystal to be injected.

The aligning film containing a polybenzylimide type polymer as the main component in the invention, acts so as to reduce the after image. This reason is not clear, but since the ratio of polar components in the polymer is small, it may be considered that it becomes hard to absorb and retain ionic impurities.

The liquid crystal display device of the invention is characterized by an alignment controlling film with reduced after image, and its voltage holding ratio is high as well. As a matter of course, the alignment of the liquid crystal is good, and it is also be possible to bring about the pretilt angle in the same degree as that of a polyetherimide type polyimide of the prior art. Further, the present invention is applicable to a ferroelectric liquid crystal aligning films.

BRIEF DESCRIPTION OF THE DRAWINGS

Further objects and advantages of the present invention will be apparent from the following description, reference being made to the accompanying drawings wherein preferred embodiments of the present invention are clearly shown.

In the drawings:

FIG. 2(A) is a circuit diagram for measuring a voltage holding ratio, while

DETAILED DESCRIPTION OF THE PREFERRED EMBODIMENTS

Referring now to preferred embodiments, a detailed description of the invention will be given below. While the embodiment of the present invention, as herein described, constitutes a preferred form, it is to be understood that other forms might be adopted.

Figure 1:
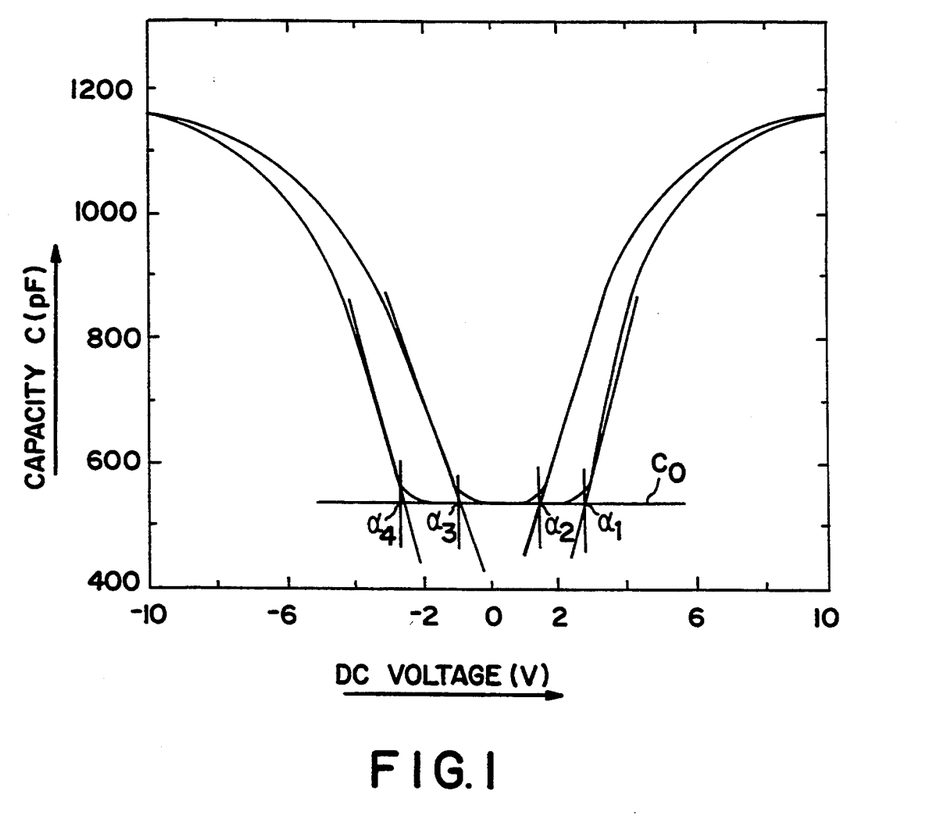
FIG. 1 is a view showing a C-V histeresis curve.

In each preferred embodiment, the degree of the after image was measured by a C-V curve method. The C-V curve method is carried out by applying to the triangle (frequency: 0.0036 Hz) a voltage of $V = \pm 10$ V to a liquid crystal cell, and then overlapping an alternating current at 25 mV and 1 KHz on this. The varying capacities, C, are then recorded. When the voltage is swept to the positive side, the capacity increases. When the voltage is swept toward the negative side, the capacity decreases to give a minimum value. Further, when the voltage is swept to the negative side of less than 0, the capacity increases again, and next, when the voltage is swept toward the positive side, the capacity decreases again. The resulting wave form after several cycles is shown in FIG. 1. At this time, when the off-setting of electric charges is produced on the interfaces of the liquid crystal aligning film and stabilized, the voltage draws a histeresis curve at both positive and negative sides. The residual electric charges are determined by drawing 2 tangents to the C-V curve at both positive and negative sides, obtaining the cross points ($\partial_1$–$\partial_4$) were these lines cross the line of capacity, $C_0$, at the time of $V=0$. The voltage differences between two points for the positive side and between two points for the negative side are examined, and then by taking the average value thereof, the residual electric charge is determined. If the film thickness of the cell and the thickness of the aligning film are equal, this value becomes a parameter for stabilizing the off-setting of electric charges. Namely, the smaller the size of histeresis in the aligning film, the less the after image.

Figure 2A:
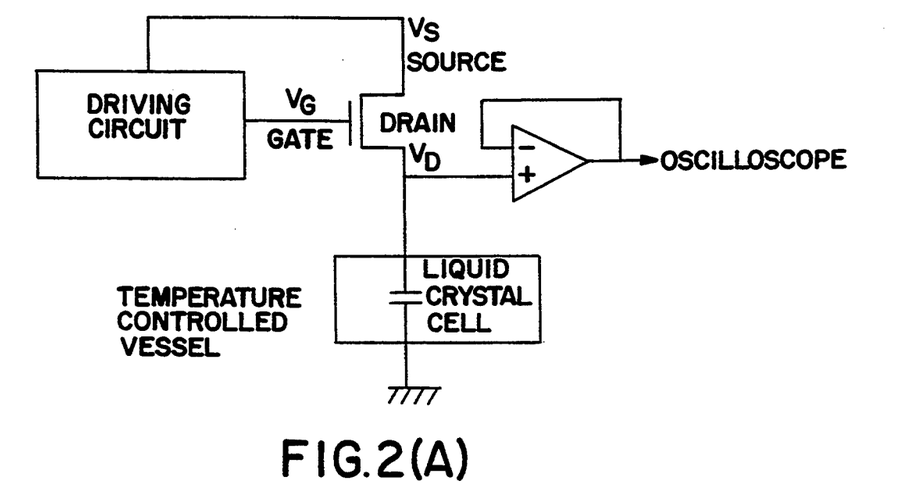
Figure 2B:
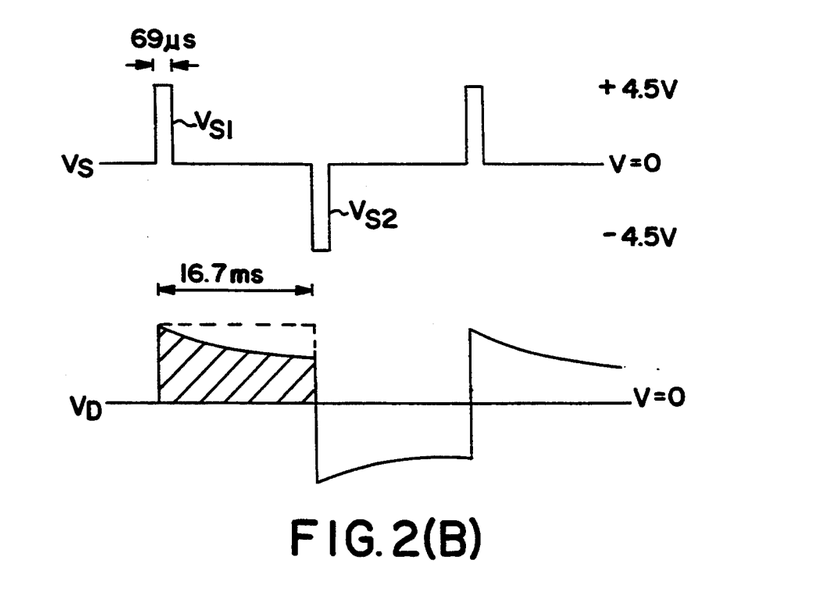
FIG. 2(B) shows a wave form of a voltage drain, $V_D$.

The measurement of a voltage holding ratio percentage was carried out using a circuit as shown in FIG. 2(A). In the circuit, a rectangular wave Vs of gate pulse width 6.9 μs, frequency 60 Hz, and wave height ±4.5 V, is applied on a source and the resulting voltage drain, $V_D$, is monitored. It is apparent from FIG. 2(B) that when a positive voltage pulse, $V_{S1}$, is applied at this point, the voltage shows a positive value during the period of time before the next negative pulse, $V_{S2}$, is applied Therefore, the area (slanting line portion) enclosed by $V=0$ and monitored voltage $V_D$ (positive value) is integrated. Such a measurement is repeated four times to obtain the average value. Setting the area, in the case that the voltage is not reduced, as 100%, a relative value of the area to this is calculated and the calculated value is defined as the voltage holding ratio (%).

Furthermore, the measurement of the pretilt angle was done by a crystal rotation method.

EXAMPLE 1

Dehydrated and refined N-methyl-2-pyrrolidone (50 ml) was put in a 200 ml four neck flask attached with a stirrer, a thermometer, a condenser and a nitrogen-replacing apparatus. Then, 1,1-bis[4-(4'-aminobenzyl)-phenyl]methane (7.43 g) was added and the mixture was stirred and dissolved. The resulting solution was cooled to 13° C., and pyromellitic acid dianhydride (4.36 g) was added to the solution at one time and allowed to react with the solution while simultaneously stirring and cooling. After 1 hour, 0.11 g of para-aminophenyl-trimethoxysilane was added to the solution and allowed to react with it at 20° C. for 1 hour while stirring. Then, the reaction solution was diluted with N-methyl-2-pyrrolidone (NMP) (58 ml) to give a clear solution of 10 wt. % polyamic acid. The viscosity of this solution at 25° C. was 1893 cps.

This solution was diluted in solution with a mixture of butyl cellosolve and NMP (1:1) to give a 3 wt. % solution, which was coated on a clear glass substrate mounted with ITO electrodes on one surface thereof by a rotational coating method (spinner method). The rotational condition was 5000 rpm for 15 seconds. After coating, the coated substrate was dried at 100° C. for 10 min., and then, its temperature was gradually increased up to 200° C. for 1 hour within an oven. It was further heat treated at 200° C. for 90 min. to give polybenzylimide having an approximate film thickness of 600 Å. The coated surfaces of two substrates on which this polybenzylimide film had been formed were treated by rubbing, respectively, to give their liquid crystal aligning films, which were incorporated in a liquid crystal cell having a cell thickness of 6μ so that their rubbing directions where in parallel with each other and faced each other, and in which Liquid Crystal FB01 for TFT use (Chisso Corporation product and its commercial name) was sealed. After sealing, an isotropic transformation treatment was applied to it at 120° C. for 30 min., and it was gradually cooled to a room temperature to give a liquid crystal display device. Furthermore, a liquid crystal cell having a cell thickness of 20μ enclosing a Merk & Co., Inc. product, Liquid Crystal ZLI-1132, was prepared, following a similar procedure described above and applied to the measurement of the pretilt angle. The alignment property of this liquid crystal was good and the pretilt angle of this liquid crystal was 3.6°. The residual electric charge of this cell was 0.07 at 25° C., and its voltage holding ratio was 97.5%.

EXAMPLE 2

Dehydrated and refined N-methyl-2-pyrrolidone (50 ml) was put in a 200 ml four-neck flask attached with a stirrer, a thermometer, a condenser and a nitrogen-replacing apparatus. Then, 1,1-bis[4-(4'-aminobenzyl)- phenyl]methane (7.43 g) was added and the mixture was stirred and dissolved. The resulting solution was cooled to 13° C., and methylcyclobutanetetracarboxylic acid dianhydride (3.92 g) was added to the solution at one time and allowed to react with the solution while simultaneously stirring and cooling. After 1 hour, para-aminophenyltrimethoxysilane (0.11 g) was added to the solution and allowed to react with it at 20° C. for 1 hour, while stirring. Then, the reaction solution was diluted with N-methyl-2-pyrrolidone (NMP) (58 ml) to give a clear solution of 10 wt. % polyamic acid. The viscosity of this solution at 25° C. was 97.5 cps.

This solution was diluted in solution with a mixture of butyl cellosolve and NMP (7:3) to give a 3 wt. % solution, which was coated on a clear glass substrate mounted with ITO electrodes on one surface thereof by a rotational coating method (spinner method). The rotational condition was 3000 rpm for 15 sec. After coating, the coated substrate was dried at 100° C. for 10 min., and then, its temperature was gradually increased up to 200° C. for 1 hour within an oven. It was further heat treated at 200° C. for 90 min. to give polybenzylimide having an approximate film thickness of 600 Å. The coated surfaces of two substrates on which this polybenzylimide film had been formed were treated by rubbing, to give their liquid crystal aligning films, which were incorporated in a liquid crystal cell having a cell thickness of 6μ so that their rubbing directions were in parallel with each other and faced each other, and in which Liquid Crystal FB01 for TFT use (Chisso Corporation product and its commercial name) was sealed.

After sealing, an isotropic transformation treatment was applied at 120° C. for 30 min. and it was gradually cooled to a room temperature to give a liquid crystal display device. Furthermore, a liquid crystal cell having a cell thickness of 20μ enclosing a Merk & Co., Inc. product, Liquid Crystal ZLI-1132, was prepared, following a similar procedure described above, and applied to the measurement of the pretilt angle.

The alignment property of this liquid crystal was good and the pretilt angle of this liquid crystal was 1.5°. The residual electric charge of this cell was 0.5 at 25° C., and its voltage holding ratio was 97.3%.

COMPARATIVE EXAMPLE 1

A mixture of 2,2-bis[4-(4'-aminophenoxy)phenyl]propane (8.06 g), pyromellitic acid dianhydride (4.36 g) and paraaminophenyltrimethoxysilane (0.11 g), was polymerized to give a polyamic acid solution.

This was diluted with a mixture solution of butyl cellosolve and NMP (1:1) to give a 3 wt. % solution, which was coated on a clear glass substrate mounted with ITO electrodes on one surface thereof by a rotational coating method (spinner method). The rotational condition was 3000 rpm for 15 sec. After coating, the coated substrate was dried at 100° C. for 10 min., and then, its temperature was gradually increased up to 200° C. for 1 hour within an oven. It was further heat treated at 200° C. for 90 min. to give polyetherimide having an approximate film thickness of 600 Å. The coated surfaces of two substrates on which this polyetherimide film had been formed were treated by rubbing, respectively, to give their liquid crystal aligning films, which were incorporated in a liquid crystal cell having a cell thickness of 6μ so that their rubbing directions were in parallel with each other and faced each other, and in which Liquid Crystal FB01 for TFT use (Chisso Corporation product and its commercial name) was sealed.

After sealing, an isotropic transformation treatment was applied to it at 120° C. for 30 min., and it was gradually cooled to a room temperature to give a liquid crystal display device. Furthermore, a liquid crystal cell having a cell thickness of 20μ enclosing a Merk & Co., Inc. product, Liquid Crystal ZLI-1132, was prepared, following a similar procedure described above, and applied to the measurement of the pretilt angle.

The alignment property of this liquid crystal was good and the pretilt angle of this liquid crystal was 3.7°. However, the residual electric charge of this cell was 0.20 at 25° C., and its voltage holding ratio was 90.0%.

COMPARATIVE EXAMPLE 2

A mixture of 2,2-bis[4-(4'-aminophenoxy)phenyl]propane (8.06 g), methylcyclobutanetetracarboxylic acid dianhydride (3.92 g) and para-aminophenyltrimethoxysilane (0.11 g), was polymerized to give a polyamic acid solution.

This solution was diluted with a mixture solution of butyl cellosolve and NMP (7:3) to give a 3 wt. % solution, which was coated on a clear glass substrate mounted with ITO electrodes on one surface thereof by a rotational coating method (spinner method). The rotational condition was 5000 rpm for 15 sec. After coating, the coated substrate was dried at 100° C. for 70 min., and then, its temperature was gradually increased up to 200° C. for 1 hour within an oven. It was further heat treated at 200° C. for 90 min. to give polyetherimide having an approximate film thickness of 600 Å. The coated surfaces of two substrates on which this polyetherimide film had been formed were treated by rubbing, respectively, to give their liquid crystal aligning films, which were incorporated in a liquid crystal cell having a cell thickness of 6μ so that their rubbing directions where in parallel with each other and faced each other, and in which Liquid Crystal FB01 for TFT use (Chisso Corporation product and its commercial name) was sealed. After sealing, an isotropic transformation treatment was applied to it at 120° C. for 30 min. and it was gradually cooled to a room temperature to give a liquid crystal display device. Furthermore, a liquid crystal cell having a cell thickness of 20μ enclosing a Merk & Co., Inc. product, Liquid Crystal ZLI-1132, was prepared, following the similar procedure described above, and applied to the measurement of the pretilt angle.

The alignment property of this liquid crystal was good and the pretilt angle of this liquid crystal was 1.5°. however, the residual electric charge of this cell was 0.15 at 25° C., and its voltage holding ratio was 89.0%.

COMPARATIVE EXAMPLE 3

A mixture of 4,4'diaminophenylether (3.46 g), pyromellitic acid dianhydride (4.36 g) and para-aminophenyltrimethoxysilane (0.11 g), was polymerized to give a polyamic acid solution.

This solution was diluted with a mixture of butyl cellosolve and NMP (1:1) to give a 3 wt. % solution, which was coated on a clear glass substrate mounted with ITO electrodes on one surface thereof by a rotational coating method (spinner method). The rotational condition was 3000 rpm for 15 sec. After coating, the coated substrate was dried at 100° C. for 10 min., and then its temperature was gradually increased up to 200° C. for 1 hour within an oven. It was further heat treated at 200° C. for 90 min. to give polyetherimide having an approximate film thickness of 600 Å. The coated sur- faces of two substrates on which this polyetherimide film had been formed were treated by rubbing, respectively, to give their liquid crystal aligning films, which were incorporated in a liquid crystal cell having a cell thickness of 6μ so that their rubbing directions were in parallel with each other and faced each other, and in which Liquid Crystal FB01 for TFT use (Chisso Corporation product and its commercial name) was sealed. After sealing, an isotropic transformation treatment was applied to it at 120° C. for 30 min. and it was gradually cooled to a room temperature to give a liquid crystal display device. Furthermore, a liquid crystal cell having a cell thickness of 20μ enclosing a Merk & Co., Inc. product, Liquid Crystal ZLI-1132, was prepared, following the similar procedure described above, and applied to the measurement of the pretilt angle.

The alignment property of this liquid crystal was good and the pretilt angle of this liquid crystal was 0.5°. However, the residual electric charge of this cell was 0.90 at 25° C., and its voltage holding ratio was 78.0%.

In accordance with the first through third embodiments of the invention of the present application, since the absorption of impurities can be decreased by reducing the polar components contained in the polymer, liquid crystal aligning films having reduced after image can be prepared. The liquid crystal display devices prepared by using these films have reduced after image and which enables them to carry out good and stable displays. The aligning films of the invention contribute to the improvement in their voltage holding ratios also.

What we claim is:

1. A liquid crystal aligning film containing a polymer having a polybenzylimide skeleton in a long molecular chain, the main component of which is represented by the general formula (1):

wherein X and Y each represents the same or atoms or groups including hydrogen atoms, an alkyl group having from 1 to 3 carbon atoms, a fluorine atom, a chlorine atom or a trifluoromethyl group, and their substituent positions may be at the ortho-position or the meta-position.

2. A liquid crystal aligning film containing a polyimide having a structural unit, the main component which is represented by the general formula (2):

wherein X and Y each represent the same or atoms or groups including hydrogen atoms, an alkyl group having from 1 to 3 carbon atoms, a fluorine atom, a chlorine atom or a trifluoromethyl group, their substituent positions may be at the ortho-position or the meta-position, and R represents a tetravalent aromatic group, a tetravalent aliphatic group or a composite tetravalent group having both aromatic and aliphatic properties.

3. A liquid crystal aligning film containing a polyimide, as the main component, prepared by heating a polyamic acid obtained by reacting, in a solvent, tetracarboxylic acid dianhydride represented by the general formula (3):

wherein R represents a tetravalent aromatic group, a tetravalent aliphatic group or a tetravalent composite group having both aromatic and aliphatic properties; with a diamino compound represented by the general formula (4):

wherein X and Y each represent the same or atoms or groups including hydrogen atoms, an alkyl group having from 1 to 3 carbon atoms, a fluorine atom, a chloride atom or a trifluoromethyl group, and these substituent positions may be at the ortho-position or the meta-position.

4. A liquid crystal aligning film according to claim 2, wherein said structural unit of the formula (2) in which a polyimide structural unit is represented by the formula (7):

is partially replaced by at least one structural unit represented by the formulae (5) and (6):

and (6):

wherein Z represents an alkylene or phenylene group having from 1 to 3 carbon atoms; $R^2$ represents an alkyl group having from 1 to 6 carbon atoms; R represents a tetravalent aromatic or aliphatic group or a tetravalent composite group having both aromatic and aliphatic properties; and m represents an integer of from 0 to 4.

5. A liquid crystal aligning film comprising a polyimide having a structural unit, the main component of which is represented by general formula (2):

(2)

wherein X and Y each represent the same or different atoms or groups including an hydrogen atom, an alkyl group having from 1 to 3 carbon atoms, a fluorine atom, a chlorine atom or a trifluoromethyl group, their substituent positions may be at the ortho-position or the meta-position, and R represents a tetravalent aromatic group, a tetravalent aliphatic group or a composite tetravalent group having both aromatic and aliphatic properties;

and wherein a polyimide structural subunit represented by formula (7) which is incorporated in said structural unit of formula (2):

(7)

is partially replaced with from 0.1 to 50 mol % of the total polyimide structural units in said film by at least one structural unit represented by the formulae (5) and (6):

(5)

and wherein Z represents an alkylene or phenylene group having from 1 to 3 carbon atoms; $R^2$ represents an alkyl group having from 1 to 6 carbon atoms; and m represents an integer of from 0 to 4.

6. A liquid crystal display device including an aligning film comprising a polymer having a skeleton in a long molecular chain, the main component of which is represented by general formula (1):

(1)

wherein X and Y each represents the same or different atoms or groups including an hydrogen atom, an alkyl group having from 1 to 3 carbon atoms, a fluorine atom, a chlorine atom or a trifluoromethyl group, and these substituent positions may be at the ortho-position or the meta-position.

7. A liquid crystal display device including an aligning film comprising a polyimide having a structural unit, the main component of which is represented by the general formula (2):

(2)

wherein X and Y each represents the same or different atoms or groups including an hydrogen atoms, an alkyl group having from 1 to 3 carbon atoms, a fluorine atom, a chlorine atom or a trifluoromethyl group, their substituent positions may be at the ortho-position or the meta-position, and R represents a tetravalent aromatic group, a tetravalent aliphatic group or a composite tetravalent group having both aromatic and aliphatic properties.

* * * * *

UNITED STATES PATENT AND TRADEMARK OFFICE
CERTIFICATE OF CORRECTION

PATENT NO. : 5,432,256
DATED : July 11, 1995
INVENTOR(S) : Abe et al.

It is certified that error appears in the above-indentified patent and that said Letters Patent is hereby corrected as shown below:

In the Abstract [57], Line 14, after "or" (first occurrence) insert --different--;

Column 11, Line 47, after "or" (first occurrence) insert --different--;

Line 63, after "or" (first occurrence) insert --different--;

Column 12, Line 26, after "or" (first occurrence) insert --different--.

Signed and Sealed this

Twelfth Day of December, 1995

Attest:

BRUCE LEHMAN

*Attesting Officer*     *Commissioner of Patents and Trademarks*